W. C. HUEBNER.
LIGHT CONTROLLING MECHANISM FOR PHOTOGRAPHIC APPARATUS.
APPLICATION FILED MAY 2, 1916.

1,222,766.

Patented Apr. 17, 1917.
6 SHEETS—SHEET 3.

Inventor.
William C. Huebner.
By Wilhelm & Parker
Attorneys.

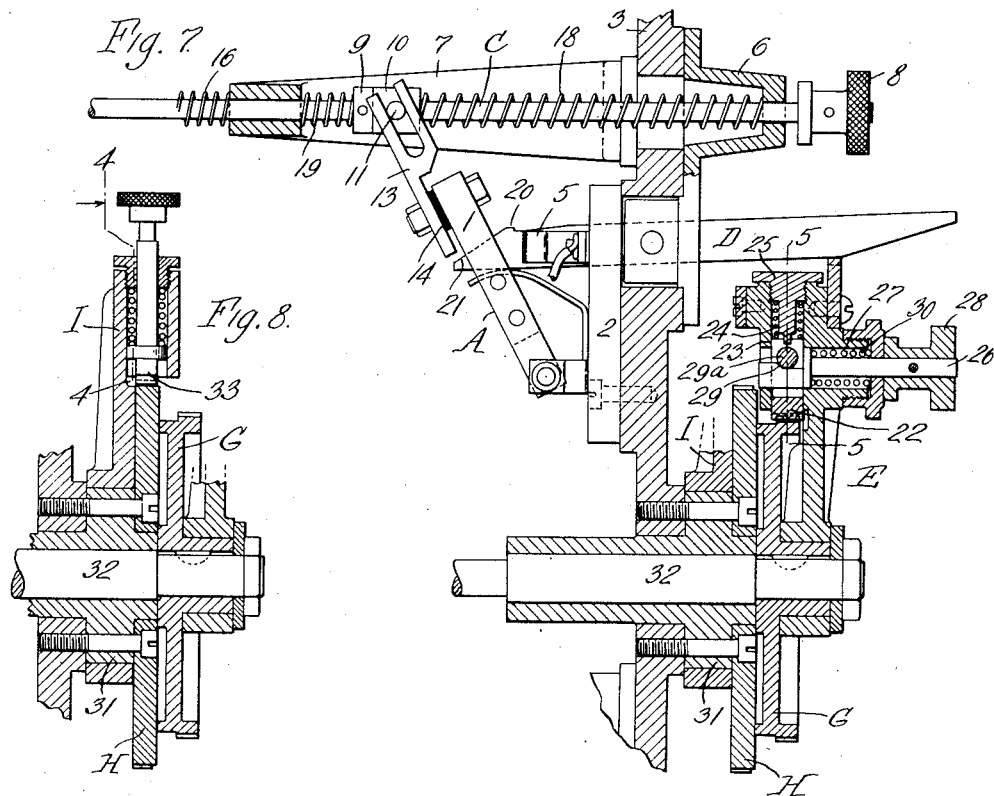
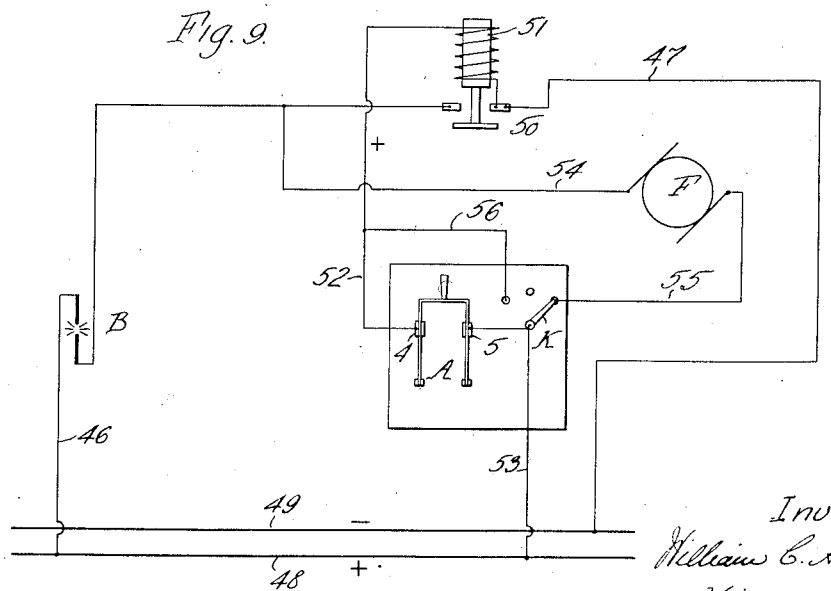

W. C. HUEBNER.
LIGHT CONTROLLING MECHANISM FOR PHOTOGRAPHIC APPARATUS.
APPLICATION FILED MAY 2, 1916.
1,222,766.
Patented Apr. 17, 1917.
6 SHEETS—SHEET 5.
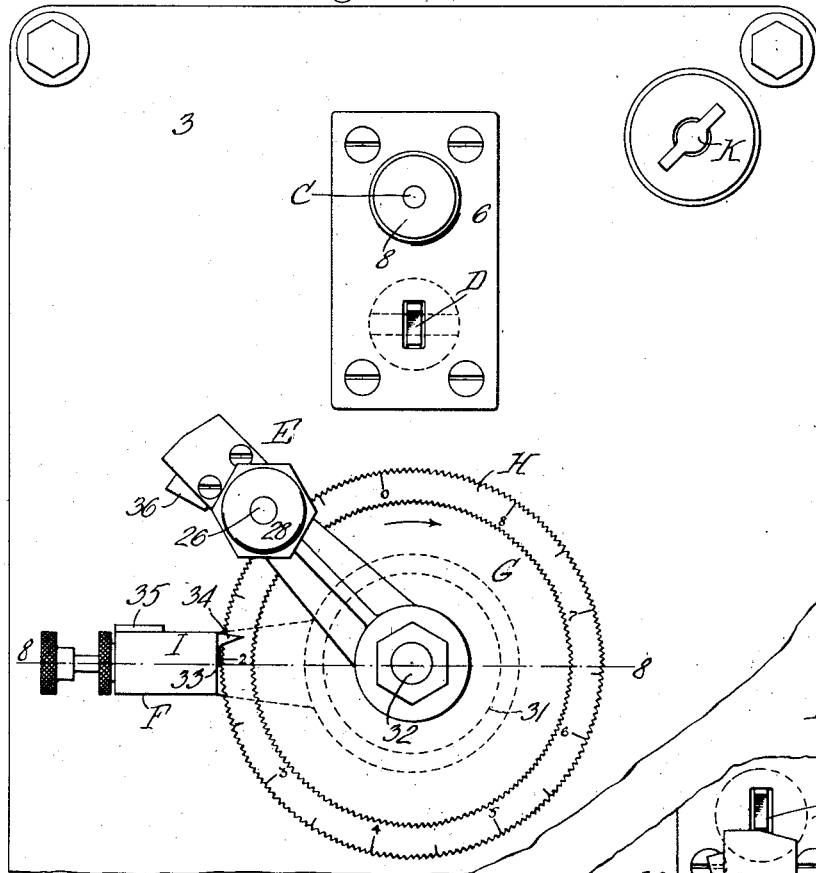
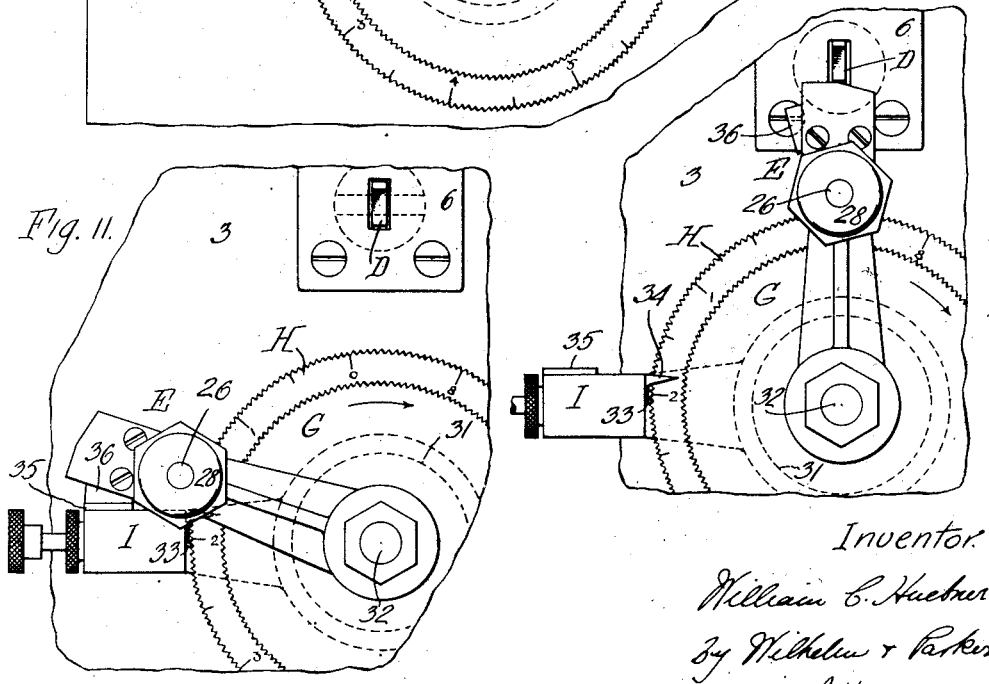
Inventor.
William C. Huebner.
By Wilhelm & Parker
Attorneys.

W. C. HUEBNER.
LIGHT CONTROLLING MECHANISM FOR PHOTOGRAPHIC APPARATUS.
APPLICATION FILED MAY 2, 1916.
1,222,766.
Patented Apr. 17, 1917.
6 SHEETS—SHEET 6.
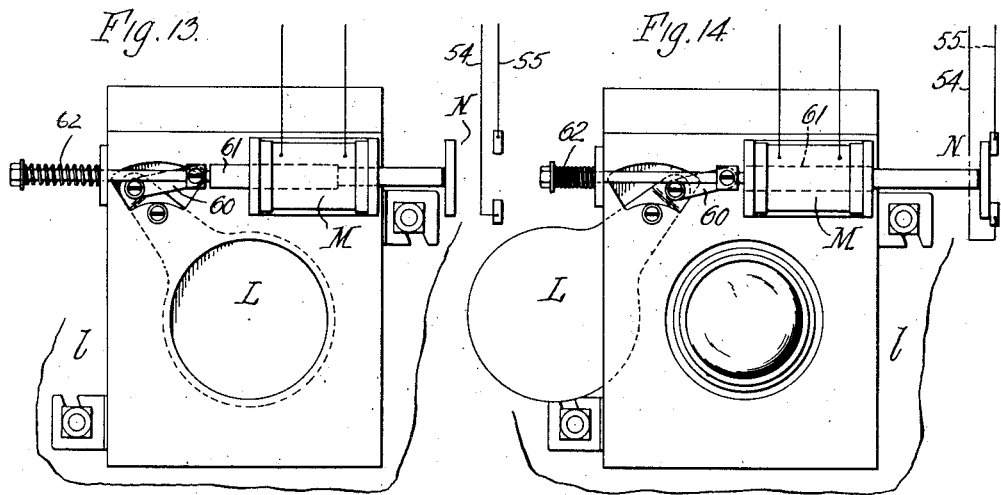
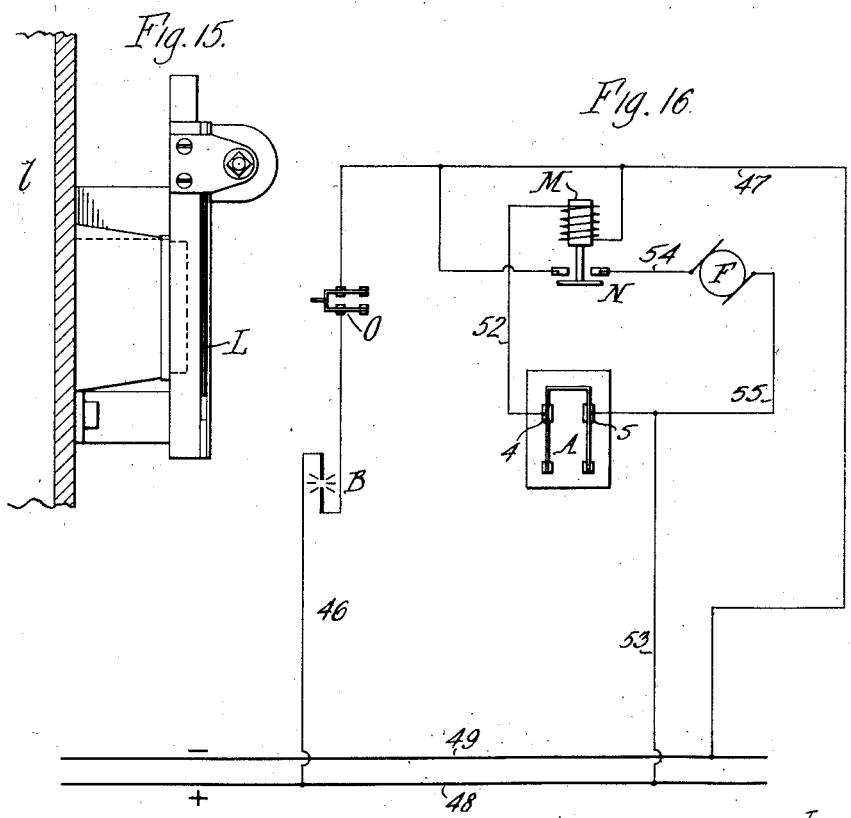
Inventor
William C. Huebner.
By Wilhelm & Parker.
Attorneys.

UNITED STATES PATENT OFFICE.

WILLIAM C. HUEBNER, OF BUFFALO, NEW YORK, ASSIGNOR TO HUEBNER-BLEISTEIN PATENTS CO., OF BUFFALO, NEW YORK.

LIGHT-CONTROLLING MECHANISM FOR PHOTOGRAPHIC APPARATUS.

1,222,766.   Specification of Letters Patent.   Patented Apr. 17, 1917.

Application filed May 2, 1916. Serial No. 95,008.

*To all whom it may concern:*

Be it known that I, WILLIAM C. HUEBNER, a citizen of the United States, residing at Buffalo, in the county of Erie and State of New York, have invented a new and useful Improvement in Light-Controlling Mechanism for Photographic Apparatus, of which the following is a specification.

This invention relates to mechanisms for use in connection, for example, with electric lamps used in photographic work for the purpose of controlling, as required, the period of exposure to the light.

One object of the invention is to provide a practical and reliable mechanism which will automatically vary the period of exposure in accordance with variations in the intensity of the electric light, due to fluctuations in the light current, in such a way as to give a definite ultimate amount of light. That is to say, the period of exposure is lengthened to compensate for a decrease in intensity of the light and is shortened with an increase in intensity of the light. Other objects of the invention are to provide a desirable mechanism of this kind which can be readily set to give exposures of different required amounts of light and will operate automatically to shut off the light at the end of the period of time necessary for the amount of light for which the mechanism is set; and also to provide a mechanism for the intended purpose of the construction hereinafter described and set forth in the claims.

The controlling mechanism comprises an electric lamp, an electric motor arranged so that its speed varies with changes in the lamp current, and a controlling device which is driven by the motor and is adapted to be set in different initial positions depending upon the required exposure and which at the end of the exposure period for which the device is set, causes the operation of means to extinguish or shut off the light. The controlling device can effect this result in different ways, as for example, by causing the operation of a switch to extinguish the light, or the operation of a camera shutter to shut off the light.

In the accompanying drawings:—

Fig. 7 is a fragmentary sectional elevation of the mechanism similar to Fig. 1, but showing parts in the position assumed to open the lamp controlling switch.

Fig. 8 is a sectional elevation thereof on line 8—8, Fig. 10.

Fig. 9 is a diagram of a suitable arrangement of the electrical connections for extinguishing the light.

Fig. 10 is a front elevation of the controlling mechanism showing the controlling device between its initial and switch releasing positions.

Fig. 11 is a fragmentary similar view showing an initial position of the controlling device.

Fig. 12 is a similar view showing the controlling device in the switch releasing position.

Figs. 13 and 14 are front elevations of a camera shutter controlled by the controlling device.

Fig. 15 is a side elevation thereof.

Fig. 16 is a diagram of electrical connection suitable for operating the shutter.

Figure 1:
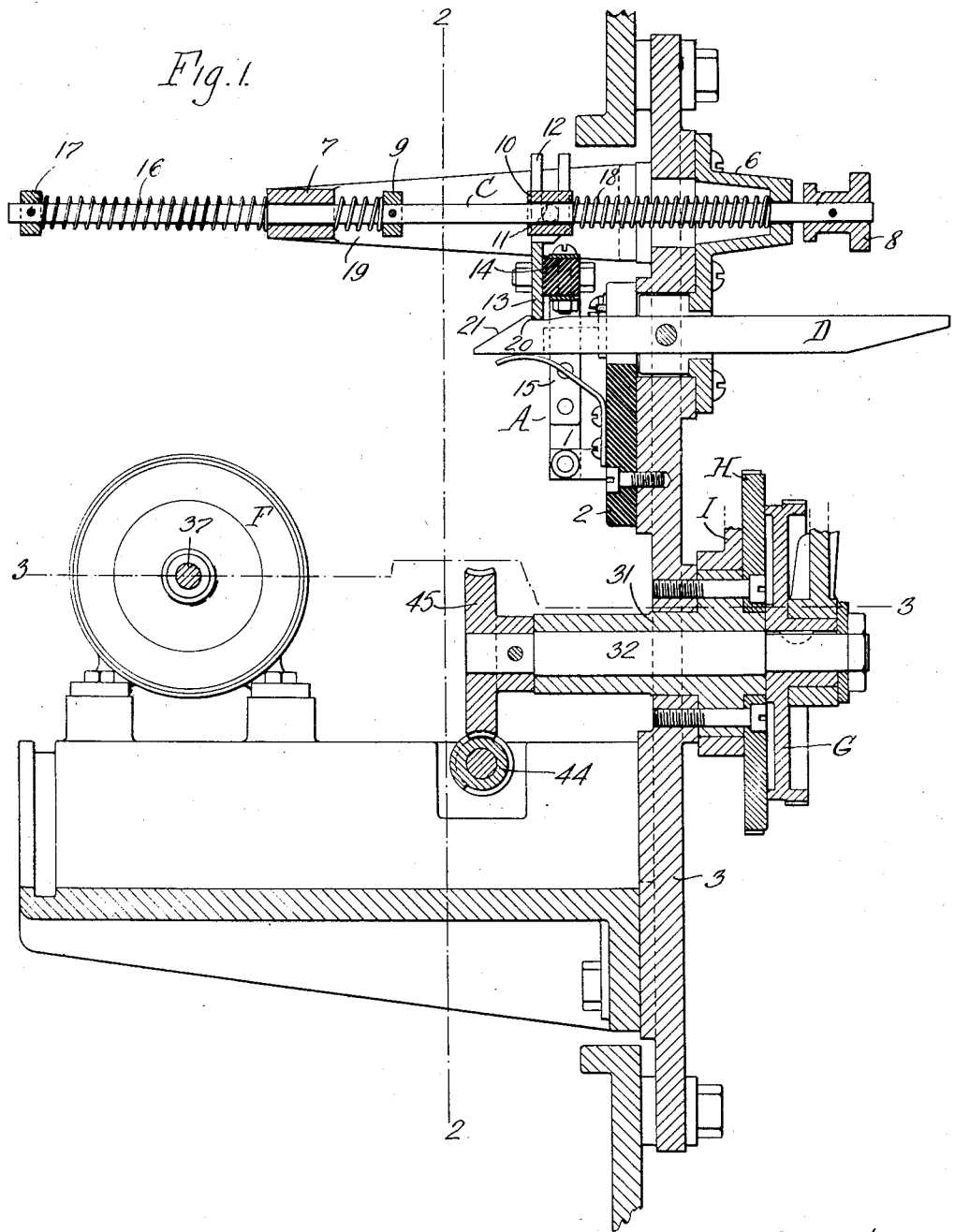
Figure 1 is a sectional elevation of a controlling mechanism embodying the invention.
Figure 2:
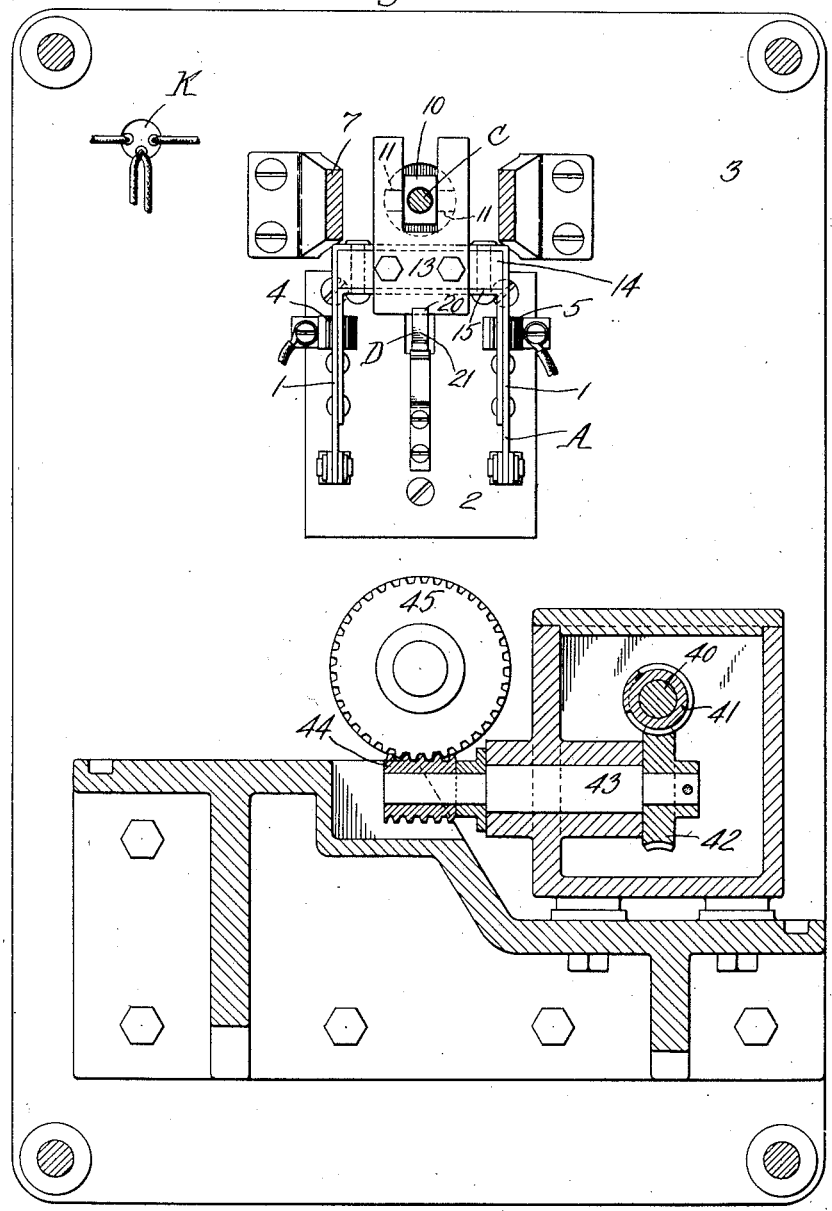
Fig. 2 is a transverse sectional elevation thereof on line 2—2, Fig. 1.
Figure 3:
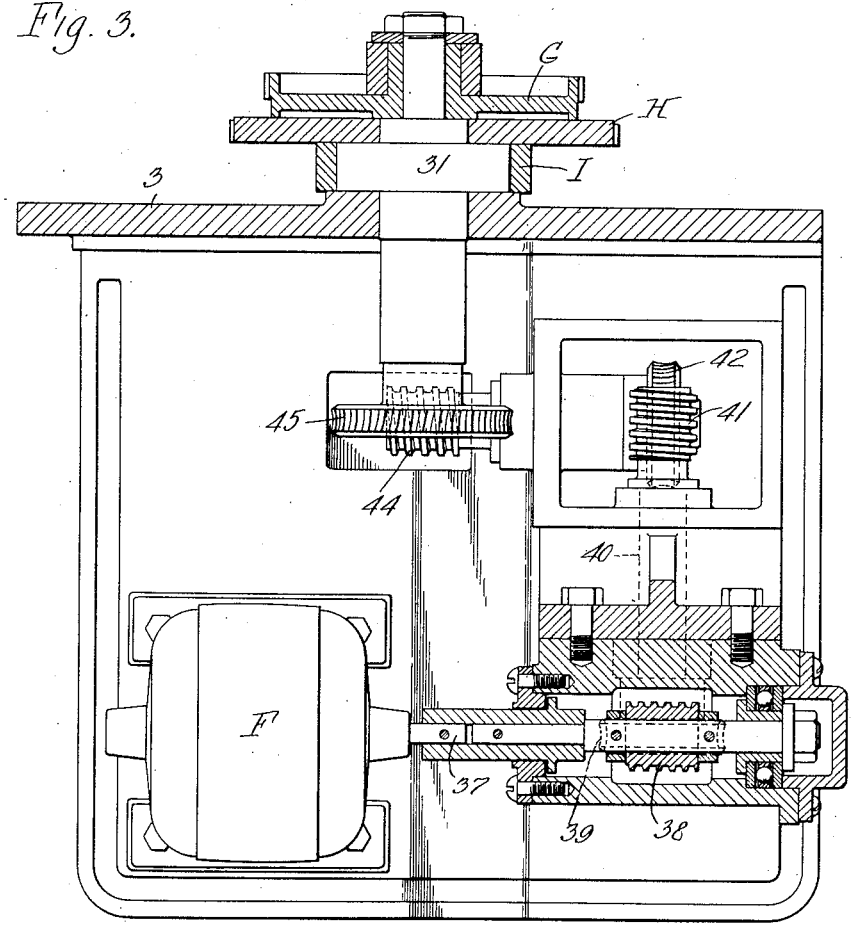
Fig. 3 is a plan view thereof, partly in horizontal section on line 3—3, Fig. 1.
Figure 4:
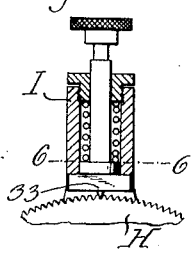
Fig. 4 is a sectional elevation of the initial stop for the controlling device on line 4—4, Fig. 8.
Figure 5:
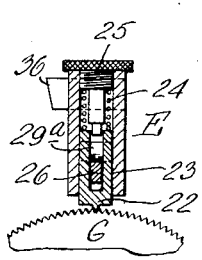
Fig. 5 is a sectional elevation on line 5—5, Fig. 7, showing the dog of the controlling device.
Figure 6:
Fig. 6 is a cross section of the stop on line 6—6, Fig. 4.

Referring first to the construction shown in Figs. 1–12 A represents a lamp controlling switch which is closed and opened for lighting and extinguishing an electric lamp B, which is used, for example, for making photographic prints. The switch A shown is a double knife blade switch consisting of a movable member having two blades 1 pivoted on an insulating block 2 fastened on the rear side of a suitable switchboard or support 3 and adapted to be moved in between the spring fingers of two contact devices 4 and 5 to which are attached the conductors of the circuit controlled by the switch. The switch is adapted to be closed by an operating rod C which extends through an opening in the support 3 and is adapted to slide endwise in suitable guide bearings 6 and 7 projecting respectively from the front and rear sides of the support 3, the rod being provided at its front end with a knob or handle 8. The rod is preferably provided in rear of the movable switch member with a fixed collar 9, which when the rod is pulled outwardly, engages a swivel block 10 through which the rod loosely passes and which is provided at opposite sides with trunnions 11 adapted to slide in slots 12 in the forked upper end of a plate 13 which is fixed to the free end of the movable switch member. The plate 13 is secured to an insulating block 14 which extends between the blades of the movable switch member and is secured to the cross bar of said member, preferably between the same and a supplemental cross bar 15. 16 is a spring surrounding the operating rod C between the rear bearing 7 and a collar or part 17 at the inner end of the rod for returning the rod to and normally holding it in its inner position, and 18 is a spring surrounding the operating rod between the front bearing and the swivel block 10 for opening the switch when the movable switch member is released as hereinafter described. When the operating rod is pulled outwardly the collar 9 thereon engages the swivel block 10 connected to the movable switch member and moves the switch member into engagement with the coöperating contact devices 4 and 5 and when the rod is released it will be returned to its normal inner position by the spring 16, leaving the movable switch member in closed position. 19 indicates a spring which surrounds the operating rod between the collar 9 and the rear guide bearing and forms a cushioning stop for the inward movement of the rod.

D represents a spring-operated latch for retaining the movable member of the switch A in closed position. This latch, as shown, consists of a bar extending through and pivoted in an opening in the support 3 and provided at its inner end with a hook 20 adapted to engage the plate 13 on the movable switch member for holding the latter, and with a beveled edge 21 adapted to be engaged by the plate 13 to permit the plate to move into engagement with the hook. The front or outer end of the latch is adapted to be actuated for releasing the movable switch member by a controlling device about to be described.

E represents a traveling controlling device which is driven by a motor F and is adapted to actuate the latch D to release and permit the opening of the lamp controlling switch A when the controlling device has been moved by the motor from a predetermined initial position in which the device is set to the latch-actuating position. The motor is so arranged that it is set in operation by, or simultaneously with the closing of the lamp controlling switch A and so that its speed varies with current changes affecting the lamp circuit, so that the controlling device will be driven faster or slower and consequently will release the switch A in a shorter or longer time in accordance with variations in intensity of the light of the lamp. As shown, this controlling device E consists of a rotatable arm which is preferably journaled loosely on the hub of a driving wheel G and is provided with a suitable dog or pawl adapted to be engaged with the wheel to cause the arm to turn with the wheel which is driven by the motor through any suitable drive gearing. 22 indicates the dog or pawl which is arranged to slide radially in a guide recess 23 in the controller arm E and is caused to engage the toothed periphery of the driving wheel G by a suitable spring 24 arranged in the guide recess between the outer end of the dog 22 and a screw 25 closing the outer end of the guide recess. The dog is retracted to permit the controlling device to be adjusted rotatably to different positions on the wheel G, preferably by a pull rod 26 which is arranged to slide in and out in an opening 27 in the controlling device and is provided at its outer end with a knob or handle 28. At its inner end this rod is provided with an extension which passes through a slot in the dog 22 and has a beveled or cam edge 29 which engages a cross pin 29ª on the dog. When the knob is pulled outwardly the cam edge 29 will move the dog 22 radially out of engagement with the teeth of the driving wheel. The pull rod is returned to and normally held in its inner position by a suitable spring 30 surrounding the rod between a shoulder thereon and a cap screw or part at the outer end of the opening for the actuating rod. When the dog 22 is released from the wheel G, the controlling device E can be turned by the knob 28 circumferentially to any desired initial position relative to the driving wheel and coupled to the wheel in this position by releasing the operating handle to permit the dog to again engage the teeth of the driving wheel. When the controlling device has been coupled to the driving wheel and the motor is started by the closing of the switch A as hereinafter described, the controlling arm E will turn with the wheel until its outer end, which preferably has a beveled edge, engages the outer end of the latch D and actuates the same to release the switch which is then opened by its spring and extinguishes the light and also stops the motor as hereinafter explained.

H represents a circular dial which is stationarily secured in rear of the driving wheel G and is provided with suitable graduations to enable the controlling device to be adjusted accurately relatively to the wheel G to different required distances from the latch D. If the controlling device E is adjusted on the driving wheel to a greater or less distance from the latch, a greater or less time will be required for the contolling device to travel to the position to operate the latch. Consequently, the controlling device can be set to cause it to release the switch A at the end of any desired interval of time by the appropriate adjustment of the controlling device on the driving wheel with reference to the dial H which is graduated to represent minutes and fractions thereof.

Preferably, an initial or starting stop is provided which is adapted to be adjusted to different positions relative to the dial H and is adapted to arrest the adjusting movement of the controlling device for determining the starting position of the controlling device. This initial stop preferably consists of an arm I which is pivoted to turn on a bearing 31 for the shaft 32 of the driving wheel G and is provided with a suitable spring actuated pawl 33 adapted to engage peripheral teeth on the dial H for holding the stop stationary in different adjusted positions. The pawl is provided at its outer end with a knob or handle for pulling it outwardly out of engagement of the teeth of the dial plate. The stop arm I is provided with a suitable pointer 34 arranged to coöperate with the graduations of the dial plate for indicating the adjustment of the stop. The stop arm I and the controlling device are provided with coöperating stop parts 35 and 36 adapted to engage each other to limit the movement of the controlling device in a direction opposite to the direction of rotation of the driving wheel G for determining the starting position of the controlling device.

The controlling device E could of course be adjusted to the required position on the wheel G by reference to the graduations on the dial H without the aid of the stop I, but the latter is desirable because after it is once set the controlling device can be quickly set repeatedly in the same initial position without requiring special care or attention by simply moving the controlling device until it is arrested by engagement with the stop. This is especially desirable when making several like exposures. While the described construction of the controlling device and means for adjustably connecting it to the driving wheel are preferred, a controlling device differently constructed and adapted to be differently connected adjustably to a driving wheel or member could be used.

Any suitable drive gearing can be employed for operatively connecting the drive wheel G to the motor F. As shown, the armature shaft 37 of the motor is provided with a worm 38 which meshes with and drives a worm wheel 39 (shown by dotted lines in Fig. 3) on a shaft 40 which is provided with a worm 41 meshing with a worm wheel 42 on a shaft 43 which in turn is provided with a worm 44 which meshes with and drives a worm wheel 45 secured to the shaft 32 of the driving wheel G for the controlling device.

As shown in Fig. 9 the electric lamp B is located in a lamp circuit 46, 47 which is connected to a supply circuit 48, 49 and is provided with a main switch 50 operated by a solenoid 51 or other electrical device. The terminals of the coil of the solenoid are connected respectively to one branch 47 of the lamp circuit and to a conductor 52 leading to one contact 4 of the automatic controlling switch A. The other contact 5 of the switch A is connected by a conductor 53 to the branch 48 of the supply circuit. Consequently, if the switch A is closed as before explained, the solenoid will be energized and close the main switch 50 and thus light the lamp B. The motor F is connected with the lamp circuit as by a conductor 54 leading to the branch 46 of the lamp circuit, and by a conductor 55 connecting with the conductor 53. When, therefore, the lamp circuit is closed current will also pass to the motor and start it so that the lamp is lighted and the motor started simultaneously by the closing of the controlling switch A, and when the controlling device E, which is driven by the motor, actuates the latch D the switch will be opened by the spring 18, and will extinguish the lamp and stop the motor. Since the motor is connected as shown, with the lamp circuit, its operating current will be affected by the current changes in the lamp circuit and the speed of the motor will vary with variations in voltage in the lamp circuit. As a result, if the voltage of the lamp circuit fluctuates and changes the intensity of the light of the lamp the speed of the motor will also change and cause the speed of travel of the controlling device E to change so as to increase or decrease the length of time of the exposure and thus compensate for the variations in intensity of the light. Thus, while the controlling device E can be set to give exposures of different desired lengths of time, the actual length of each exposure will be automatically increased or decreased so as to compensate for variations in the intensity of the light.

The controlling switch A as shown is a relay switch controlling the operation of the main lamp switch 50, this being preferable for practical reasons but it is not necessary for the switch A to be a relay switch and it is not intended to limit the claims to such an arrangement.

A hand operated switch K is preferably provided which can be set as shown in Fig. 9 to connect the conductor 53 with the conductor 55 or with a conductor 56 leading around the controlling switch A. When it is desired to cut out the motor F and the automatic controlling switch A and control the lamp by hand, the switch K is moved out of connection with the conductor 55 and can be moved at will into and out of connection with the conductor 56 to light and extinguish the lamp B.

In the apparatus illustrated in Figs. 13–16, L indicates a shutter for admitting light to or shutting it off from a camera $l$ to which the shutter is applied, and M indicates a solenoid or other electrical device controlling the operation of the shutter. The shutter can be constructed and operatively connected with the solenoid in any suitable way, for instance, the shutter is pivotally mounted and connected by a link 60 to a rod fixed to a movable core 61 of the solenoid. When the solenoid is energized it opens the shutter and when it is deënergized a spring 62 acting on its core rod closes the shutter. As shown in Fig. 16, the solenoid M is connected in the circuit 52—53 controlled by the automatic switch A, as in the arrangement before described so that when the switch A is closed the solenoid will be energized and open the shutter L and when the switch is opened by the controlling device E the solenoid will be deënergized and the shutter will be closed by the spring 62. This solenoid also operates a switch N in the motor circuit 54—55 so that the motor will be started with the opening of the shutter and stopped with the closing of the shutter.

O indicates a switch of any suitable kind adapted to be operated at will to light the lamp B and extinguish the light.

The apparatus just described involving the shutter is desirable for use in connection with a camera when it is being used for repeating exposures of such short duration that it is not desirable to turn the light on and off owing to the time required each time for the light to brighten up to its normal intensity.

I claim as my invention:

1. The combination of an electric lamp, an electric motor, a switch controlling the current to said lamp and said motor, a traveling controlling device which is driven by said motor and causes the operation of said switch to extinguish the light of the lamp when the controlling device is moved by the motor to a predetermined position, and means for connecting said controlling device operatively with the motor in different initial positions relative to said predetermined position for regulating the length of time that the lamp remains lighted.

2. The combination of an electric lamp, an electric motor whose speed varies with variations in the lamp current, a traveling controlling device which is driven by said motor and means which operate to shut off the light when said controlling device has been moved to a predetermined position by the motor.

3. The combination of an electric lamp, an electric motor whose speed varies with variations in the lamp current, a traveling controlling device which is driven by said motor, means which operate to shut off the light when said controlling device has been moved to a predetermined position by the motor, and means for placing said controlling device in driving connection with the motor in different initial positions relative to said predetermined position for regulating the length of time that the light is effective.

4. The combination of an electric lamp, an electric motor whose speed varies with variations in the lamp current, a traveling controlling device, means controlled by said controlling device for shutting off the light when said controlling device has been moved to a predetermined position, and drive gearing connecting said motor to said controlling device, said controlling device being connectible with said gearing at different distances from said predetermined position.

5. The combination of an electric lamp, an electric motor whose speed varies with variations in the lamp current, a traveling controlling device which is driven by said motor, a switch controlling the lamp, and means controlled by said controlling device for operating said switch when the controlling device has been moved to a predetermined position by the motor.

6. The combination of an electric lamp, an electric circuit therefor, an electric motor associated with said lamp circuit so as to cause the speed of the motor to vary with variations in voltage in the lamp circuit, a traveling controlling device which is driven by said motor, and means controlled by said controlling device for extinguishing the light of the lamp when the controlling device has been moved to a predetermined position by the motor.

7. The combination of an electric lamp, an electric motor whose speed varies with variations in the lamp current, a traveling controlling device which is driven by said motor, a switch controlling the lamp, and a latch which retains the switch closed and is actuated by said controlling device to permit the opening of the switch when the controlling device has been moved to a predetermined position by the motor.

8. The combination of an electric lamp, an electric motor whose speed varies with variations in the lamp current, a driving member driven by the motor, a traveling controlling device which is connectible in an initial position with said driving member to be driven thereby, and means controlled by said controlling device for extinguishing the light of the lamp when the controlling device has been moved a predetermined distance from said initial position.

9. The combination of an electric lamp, an electric motor, a driving member driven by the motor, a traveling controlling device, means for connecting the controlling device to said driving member in different initial positions, and means operated by the controlling device for extinguishing the light of the lamp when the controlling device has been moved to a predetermined position by the motor.

10. The combination of an electric lamp, an electric motor, a driving member driven by the motor, a traveling controlling device, means for connecting the controlling device to said driving member in different initial positions, means for lighting the lamp and starting the motor, and means controlled by the controlling device or operating said other means to extinguish the light of the lamp and stop the motor when the controlling device has been moved to a predetermined position by the motor.

11. The combination of an electric lamp, an electric motor whose speed varies with variations in the lamp current, a traveling controlling device which is driven by said motor, means for lighting the lamp and simultaneously starting the motor, and means controlled by the controlling device which operate to extinguish the light of the lamp and stop the motor when the controlling device has been moved to a predetermined position by the motor.

12. The combination of an electric lamp, an electric motor, a switch, a traveling controlling device which is driven by the motor and is connected with the motor in a predetermined position, and a latch which holds the switch closed and is actuated by said controlling device to release and permit the opening of the switch.

13. The combination of an electric lamp, an electric motor, a switch for lighting the lamp and starting the motor, a wheel driven by the motor, a controlling device, means for connecting the controlling device to said wheel in different initial positions, and a latch which holds the switch closed and is actuated by said controlling device to release and permit the opening of the switch.

14. The combination of an electric motor, a switch, a wheel driven by the motor, a controlling device, means for connecting the controlling device to said wheel in different initial positions, an adjustable stop device adapted to be set in different positions and to be engaged by the controlling device to determine the initial positions thereof, and a latch which holds the switch closed and is actuated by the controlling device to release and permit the opening of the switch.

15. The combination of an electric lamp, a switch, a traveling controlling device, driving means therefor which are started when said switch is operated and which vary the speed of said controlling device with variations in the lamp current, and means controlled by the controlling device which operate the switch when the controlling device has been moved to a predetermined position.

16. The combination of an electric lamp, a switch controlling the current to the lamp, a traveling controlling device, driving means therefor which are started when said switch is operated to light the lamp, means for connecting the controlling device to its driving means in different initial positions, and means controlled by the controlling device which operate the switch to extinguish the light of the lamp when the controlling device has been moved from the initial position in which it is set to a predetermined position.

Witness my hand this 24th day of April, 1916.

WILLIAM C. HUEBNER.

Witnesses:
KARL E. WILHELM,
A. L. McGEE.